(12) United States Patent
Jaeger

(10) Patent No.: US 10,035,448 B1
(45) Date of Patent: Jul. 31, 2018

(54) PIVOTING STROBE LIGHT

(71) Applicant: Lori Lynn Smith, Oregon, OH (US)

(72) Inventor: David A. Jaeger, Oregon, OH (US)

(73) Assignee: Lori L. Smith, Oregon, OH (US)

( * ) Notice: Subject to any disclaimer, the term of this patent is extended or adjusted under 35 U.S.C. 154(b) by 156 days.

(21) Appl. No.: 15/214,775

(22) Filed: Jul. 20, 2016

Related U.S. Application Data

(60) Provisional application No. 62/194,546, filed on Jul. 20, 2015.

(51) Int. Cl.
*B60Q 1/00* (2006.01)
*B60P 1/44* (2006.01)

(52) U.S. Cl.
CPC .................. *B60P 1/4464* (2013.01)

(58) Field of Classification Search
CPC ............. B60P 1/4464; B60P 3/18; B60P 3/10

USPC ......................................................... 362/485
See application file for complete search history.

(56) References Cited

U.S. PATENT DOCUMENTS

| | | |
|---|---|---|
| 1,620,356 A | 3/1927 | Jory |
| 4,737,759 A * | 4/1988 | Stropkay ............ B60R 16/0233 200/61.52 |
| 6,481,366 B1 | 11/2002 | Patera |
| 7,705,720 B2 | 4/2010 | Jachmann |

* cited by examiner

*Primary Examiner* — Anh Mai
*Assistant Examiner* — Meghan Ulanday
(74) *Attorney, Agent, or Firm* — MacMillan, Sobanski & Todd, LLC

(57) ABSTRACT

A warning light assembly for a vehicle having a tilt bed is provided. The warning light assembly includes a housing having an opening and a light assembly pivotally suspended within the housing. The light assembly is configured to pivot through the opening when the housing is rotated, thereby remaining in a substantially perpendicular orientation relative to a ground surface.

13 Claims, 6 Drawing Sheets

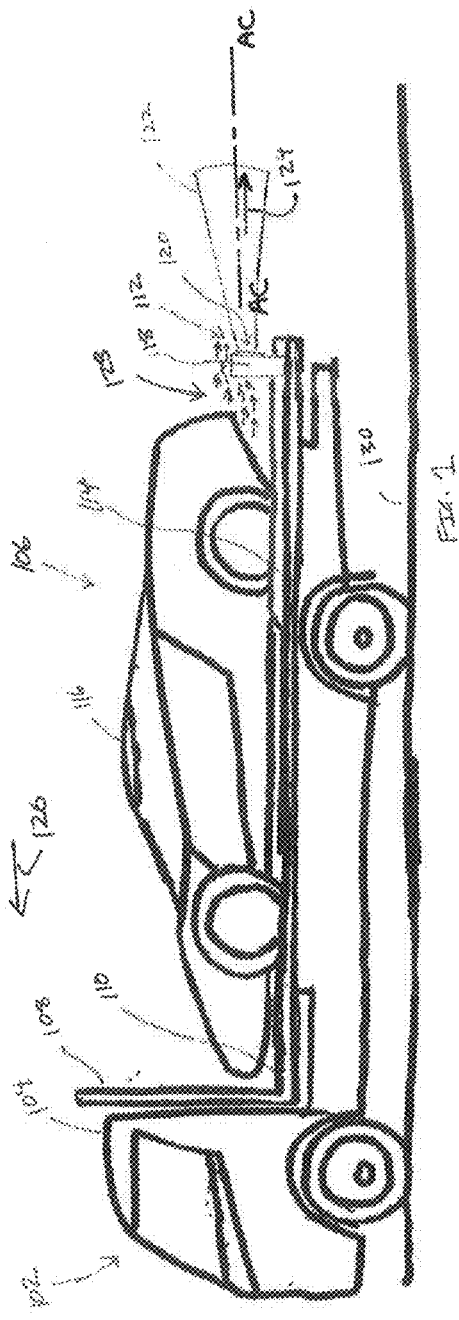
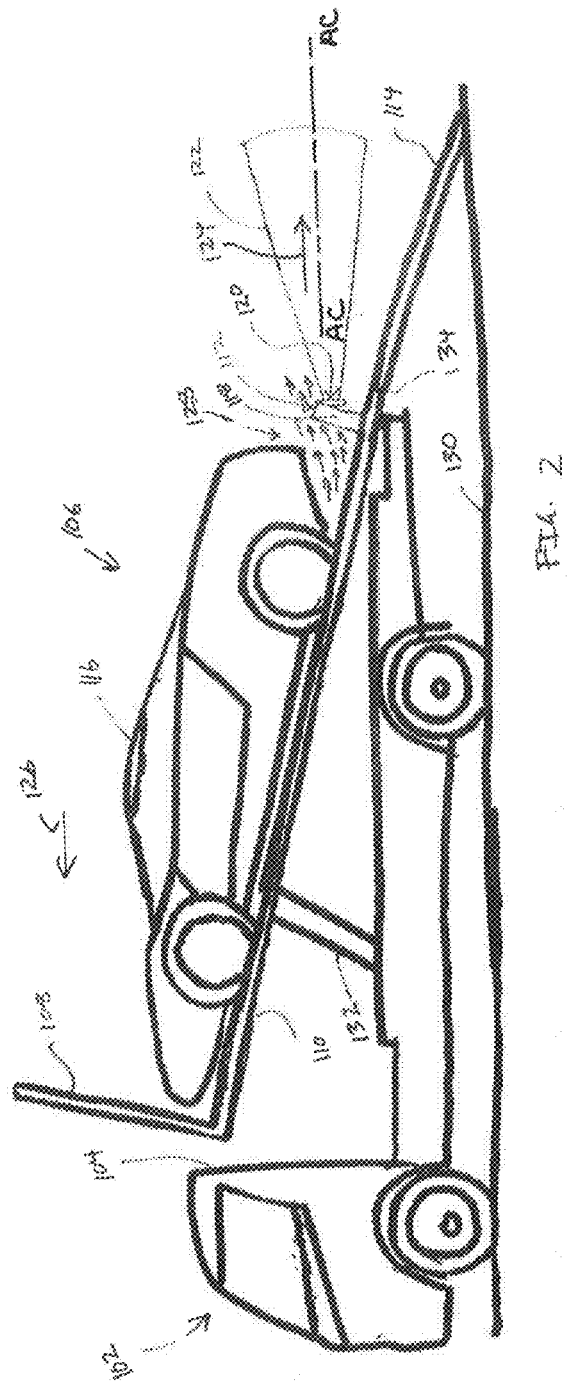

PIVOTING STROBE LIGHT

CROSS-REFERENCE TO RELATED APPLICATIONS

This application claims the benefit of United States Provisional Application No. 62/194,546, filed Jul. 20, 2015, the disclosure of which is incorporated herein by reference in its entirety.

BACKGROUND

This invention relates in general to lighting fixtures that are supported on a motor vehicle. In particular, this invention relates to a structure for pivotally supporting a light on a movable truck tilt bed.

A variety of motor vehicles are known in the art to include a movable tilt bed for carrying a load. For example, a tow truck may use a tilt bed for supporting and transporting a vehicle thereon. As is well known in the art, the tilt bed of the tow truck can be pivoted from a generally horizontal orientation to an inclined orientation, wherein a winch or other device may be used to pull the vehicle onto the tilt bed. Thereafter, the tilt bed can be returned to the horizontal orientation to transport the vehicle.

Because such transport and other operations may take place in areas that are congested with traffic, or may occur in inclement weather or at night, warning lights are commonly mounted on the tilt bed. It is known that such warning lights may be mounted on the vehicle such that they shine rearwardly and alert approaching traffic of the presence of the tow truck. In some instances, such warning lights can be directly mounted on the tilt bed of the tow truck.

In the past, such warning lights have been formed from incandescent bulbs that emit light in all directions. More recently, however, newer lighting technologies, such as bulbs formed with light-emitting diodes (also referred to as LED bulbs), are used that project narrow beams of light in fewer directions. When such LED bulbs are directly mounted on the tilt bed of the tow truck and the tilt bed is pivoted to load or unload the vehicle, such warning lights may not shine sufficiently brightly to alert the approaching traffic of the potential hazard. Instead, the narrow beams of light generated by these warning lights may primarily shine only a relatively short distance downwardly onto the road upon which the tow truck is located. Therefore, it would be desirable to provide an improved structure for a vehicle warning light that addresses this potential problem.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the parking enforcement system.

The above objects as well as other objects not specifically enumerated are achieved by a warning light assembly for a vehicle having a tilt bed. The warning light assembly includes a housing having an opening and a light assembly pivotally suspended within the housing. The light assembly is configured to pivot through the opening when the housing is rotated, thereby remaining in a substantially perpendicular orientation relative to a ground surface.

The above objects as well as other objects not specifically enumerated are achieved by a vehicle warning light system. The vehicle warning system includes a vehicle having a tilt bed movable between a first position and a second position. The first position has a substantially horizontal orientation relative to a ground surface and the second position has an inclined orientation relative to a ground surface. A housing is mounted on the vehicle. The housing has an opening. A pendulum plate is pivotally suspended from the housing. The plate is configured to pivot through the opening when the tilt bed moves between the first position and the second position and a light assembly mounted to the pendulum plate.

The above objects as well as other objects not specifically enumerated are achieved by a combined vehicle and warning light system. The combined vehicle and warning light system includes a vehicle having a tilt bed movable between a first position and a second position. The vehicle is supported by a ground surface. The first position has a substantially horizontal orientation relative to the ground surface, and the second position is inclined relative to the ground surface. A housing is mounted on the vehicle, the housing having an opening. A pendulum plate is pivotally suspended from the housing. A light assembly is mounted to the pendulum plate and is configured to pivot in and out of the housing such that the light assembly projects a beam of light having a longitudinal axis that is substantially parallel to the ground surface when the tilt bed moves between the first position and the second position Various aspects of this invention will become apparent to those skilled in the art from the following detailed description of the preferred embodiment, when read in light of the accompanying drawings.

BRIEF DESCRIPTION OF THE DRAWINGS

FIG. 1 is a side elevational view of a truck including a tilt bed and a warning light assembly in accordance with this invention, wherein the tilt bed is shown in a first position relative to the truck.

FIG. 2 is a side elevational view similar to FIG. 1, wherein the tilt bed is shown in a second position relative to the truck.

DETAILED DESCRIPTION OF THE PREFERRED EMBODIMENT

Figure 3:
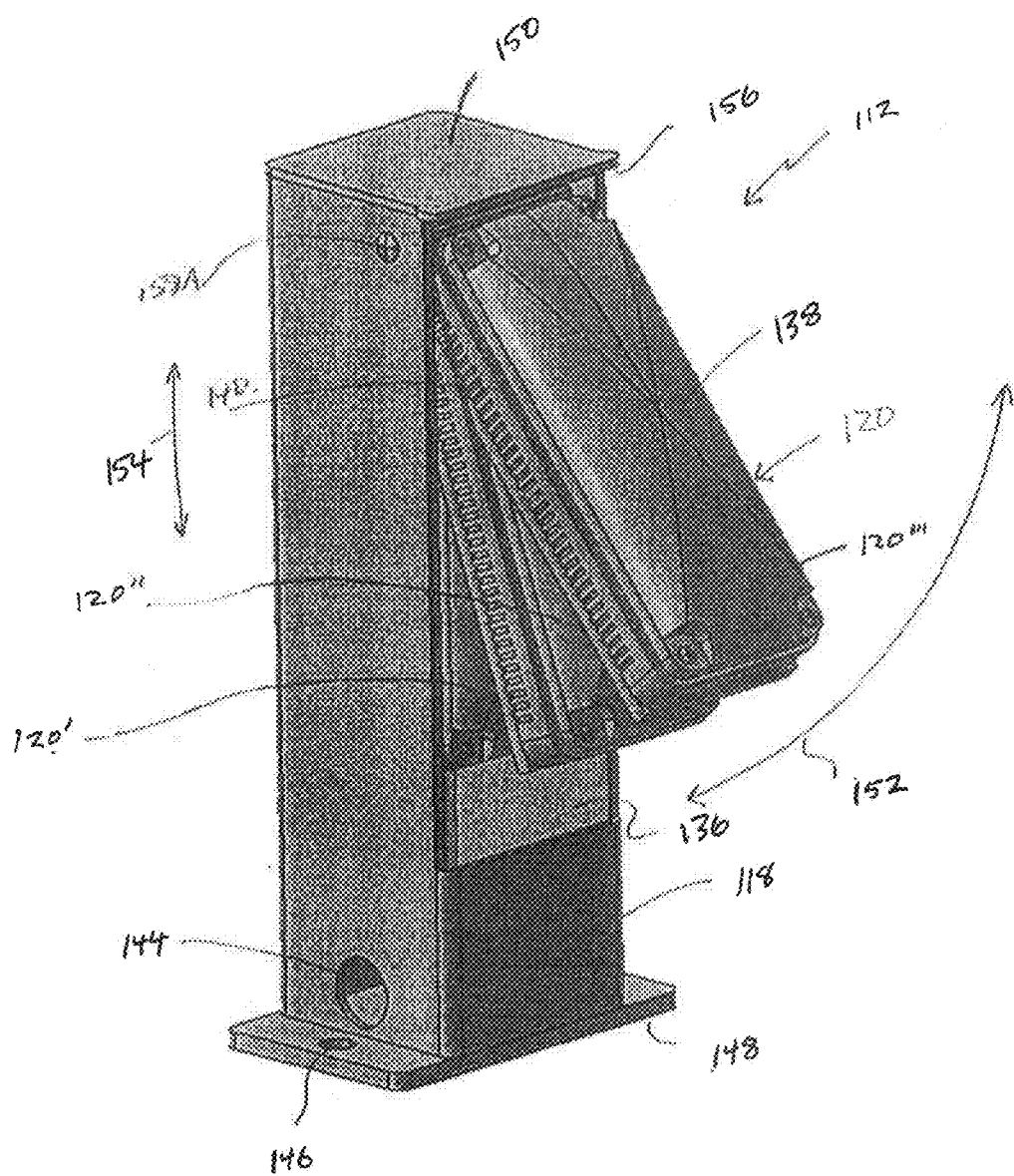
FIG. 3 is a perspective view of the warning light assembly illustrated in FIGS. 1 and 2.

Referring now to FIG. 1, there is illustrated a first vehicle or truck, indicated generally at 102. As illustrated, the truck 102 is a tow truck. Alternatively, the truck 102 may be other than a tow truck. For example, the truck 102 may be a dump truck. The truck 102 has a cab 104 and a cargo area, indicated generally at 106. The cargo area 106 includes a stop rail 108, a tilt bed 110, a warning light assembly, indicated generally at 112, and a bed extension 114.

Referring again to FIG. 1, the cargo area 106 is in a first position for transporting a load. As illustrated, the load is a second vehicle or automobile 116. Alternatively, the load may be other than the automobile 116. For example, the load may be soil or palletized materials. In the first position, the tilt bed 110 has a substantially horizontal orientation. The automobile 116 is secured to the tilt bed 110 with suitable securing devices, such as for example, tie-down straps. With the automobile 116 loaded on the tilt bed 110, the bed extension 114 is in a stowed position atop the tilt bed 110.

The warning light 112 includes a housing 118 and a light assembly 120. The housing 118 is attached to the tilt bed 110. As will be discussed below, the light assembly 120 is pivotally suspended inside the housing 118. The light assembly 120, having a generally perpendicular orientation relative to a ground surface 130, projects a beam of light 122 in a rearward direction 124. The beam of light 122 is configured to alert and warn any rear approaching traffic or pedestrians of the truck 102. The beam of light 122 is radially centered about a longitudinal axis AC-AC. With the cargo area 106 in the first position, the longitudinal axis AC-AC is substantially parallel to the ground surface 130.

When the truck 102 is moving in a forward direction 126, the housing 118 serves as a wind block or shield for the light assembly 120. Wind currents or turbulence, indicated generally at 128, and are produced by the truck 102 moving in the forward direction 126. The housing 118 is configured to deflect the wind currents 128 away from the light assembly 120. As such, the light assembly 120 is not buffeted by the wind currents 128 and the light assembly 120 can remain in a generally perpendicular orientation relative to the ground surface 130 upon which the truck 102 moves in the forward direction 126. The ground surface 130 is substantially parallel to the rearward direction 124.

In the embodiment illustrated in FIG. 1, the warning light 112 is mounted at a rear location on the tilt bed 110. Alternatively, the warning light 112 may be located elsewhere on the tilt bed 110, cargo area 106, or truck 102. For example, the warning light 112 may be located on the stop rail 108.

Referring now to FIG. 2, there is illustrated the truck 102 with the cargo area 106 in a second position. The second position is used when the automobile 116 is loaded on or off the cargo area 106. A hydraulic piston 132 pivots the cargo area 106 between the first position, in which the tilt bed 110 is substantially parallel to the ground surface 130, and the second position, in which the tilt bed 110 is inclined relative to the ground surface 130 and truck 102.

Referring again to FIG. 2, in order to load the automobile 116 onto the tilt bed 110, the cargo area 106 is placed in the second position using the hydraulic piston 132. When the cargo area 106 is in the second position, the tilt bed 110 is not parallel to the ground surface 130. The bed extension 114 is pivoted about a rotation point 134 to bridge a gap between the tilt bed 110 and the ground surface 130. When bridging the gap, the bed extension is in a deployed position. A winch then pulls the automobile 116 up the bed extension 114 and onto the tilt bed 110. The hydraulic piston 132 then returns the cargo area 106 to the first position, the bed extension 114 is placed in the stowed position, and the automobile 116 is secured before the truck 102 moves. Unloading of the automobile 116 is the same as loading, but in reverse. The tilt bed 110, bed extension 114, hydraulic piston 132, and loading and unloading of the automobile 116, are representative and may be other than as described.

Referring again to FIG. 2, since the light assembly 120 is mounted on the tilt bed 110, the light assembly 120 moves as the tilt bed 110 moves. When the tilt bed 110 is pivoted to the second position, the light assembly 120 also becomes inclined. As will be discussed further, when the light assembly 120 is inclined with the tilt bed 110, the force of gravity pivots the light assembly 120 at least partially out of the housing 118 such that the light assembly 120 remains in a perpendicular orientation relative to the ground surface 130. The beam of light 122 likewise remains projecting in the rearward direction 124 and the longitudinal axis AC-AC remains substantially parallel to the ground surface 130.

Referring now to FIGS. 3-7, the warning light 112 is shown in greater detail. The housing 118 has an opening 136 through which the light assembly 120 may shine out. The light assembly 120 includes a bulb assembly 138 mounted to a pendulum plate 140. The pendulum plate 140 is pivotally suspended from a rod 142 in the housing 118.

Referring again to FIGS. 3-7, the housing 118 is a hollow tubular shape and includes drain holes 144, mounting holes 146, a base plate 148, and a top plate 150. The drain holes 144 is configured to drain moisture that enters the housing 118. The mounting holes 146 are configured to receive fasteners for mounting the warning light 112 on the truck 102. For example, the housing 118 may be attached to the truck 102 via fasteners (not shown) received by the mounting holes 146. The base and top plates 148 and 150, respectively, are attached to the housing 118 by a suitable means. As one non-limiting example, the housing 118 and the base and top plates 148 and 150 can be attached together by welding.

Figure 4:
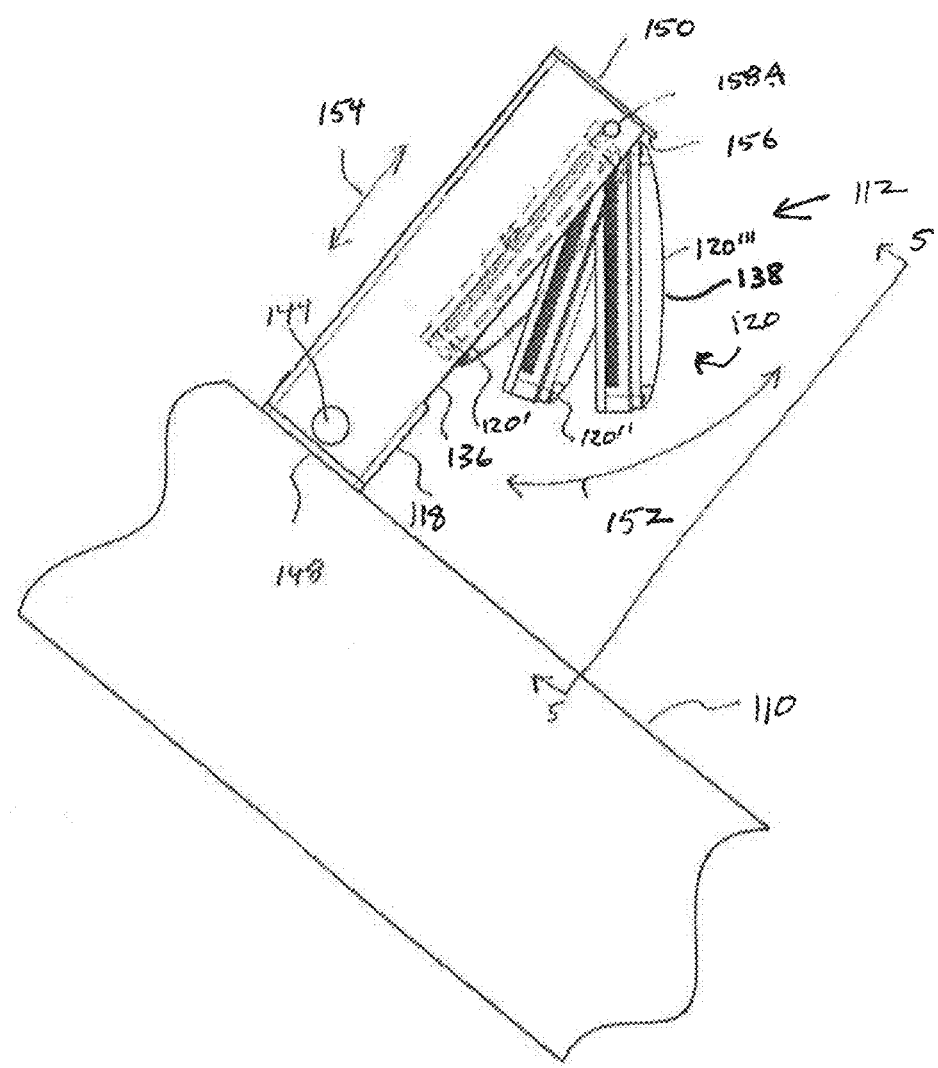
FIG. 4 is a side elevational view of a portion of the tilt bed and of the warning light assembly illustrated in FIGS. 1 and 2.
Figure 5:
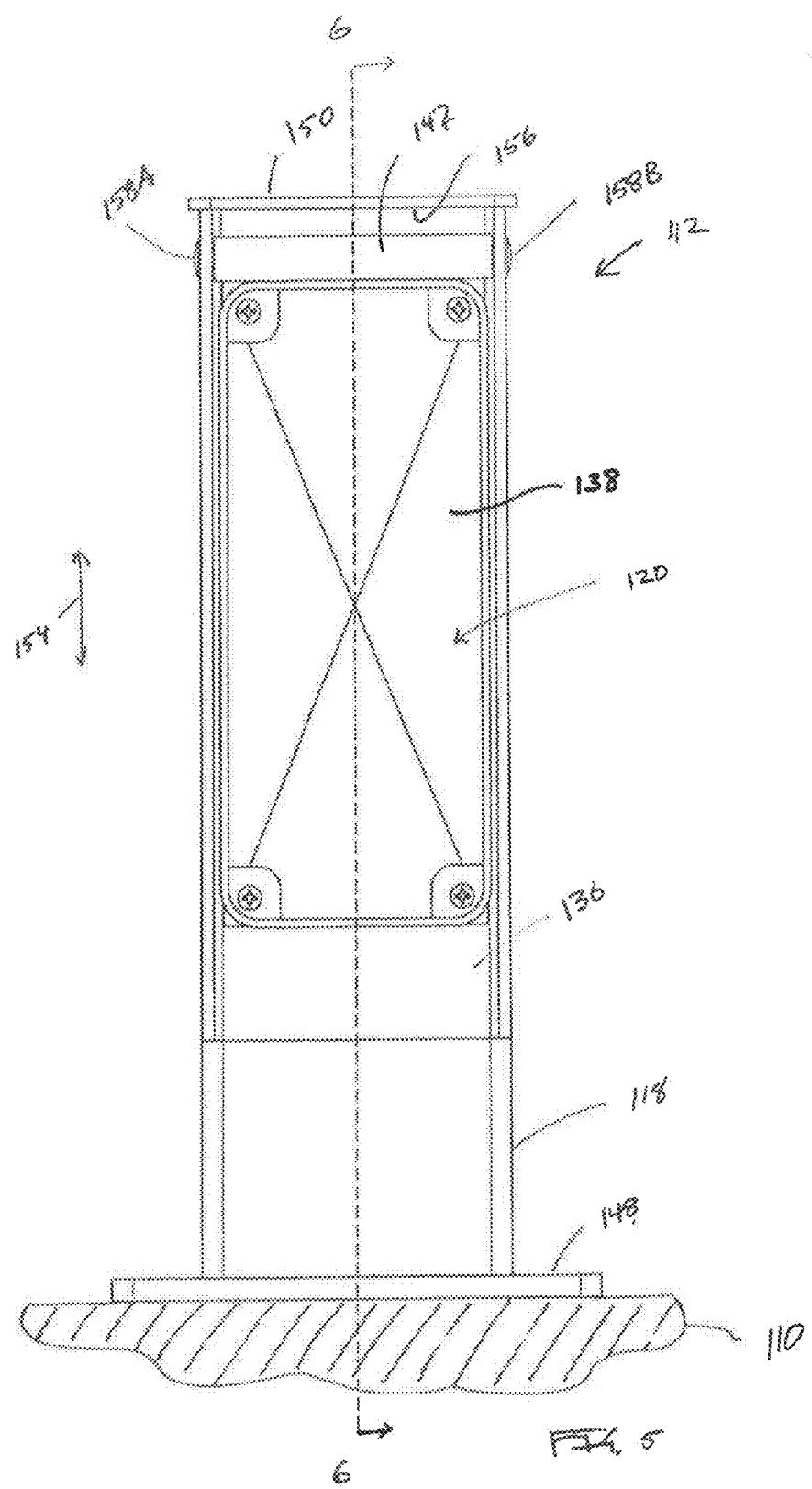
FIG. 5 is a front elevational view taken along line 5-5 of FIG. 4.

The light assembly 120 is configured to pivot out of the housing 118 through the opening 136 and along an arc 152 when the housing 118 rotates. For example, the housing 118 rotates about the rotation point 134 when the cargo area 106 pivots between the first position and the second position. Referring now to FIGS. 3 and 4, the light assembly 120 is shown at representative first, second, and third positions 120', 120", and 120''', respectively, along the arc 152. The light assembly 120 moves continuously along the arc 152 and through the first, second, and third positions 120', 120", and 120''', respectively as the tilt bed 110 is pivoting. In FIG. 3, the second and third positions 120" and 120''', respectively, are illustrated with phantom lines and in FIG. 4, the first and second positions 120' and 120", respectively, are illustrated with phantom lines.

The first light position 120' is a starting position. When the cargo area 106 is in the first position (illustrated in FIG. 1), the housing 118 has a substantially perpendicular orientation relative to the ground surface 130 and the light assembly 120 is in the first light position 120'. In the first light position 120', the light assembly 120 is hanging in a substantially parallel orientation relative to a vertical axis 154 of the housing 118 and shines through—i.e., out of—the opening 136. As the tilt bed 110 is pivoted, the light assembly 120 concurrently pivots along the arc 152 until the tilt bed 110 stops pivoting or the light assembly 120 strikes a stop 156. Referring now to FIG. 4, the tilt bed 110 is in a pivoted orientation and the light assembly 120 is in the third light position 120''', which is substantially perpendicular to the ground surface 130. As the tilt bed 110 pivots from the first to the second position of the cargo area 106, the light assembly 120 pivots along the arc 152 and remains in a substantially perpendicular orientation relative to the ground surface 130.

Figure 6:
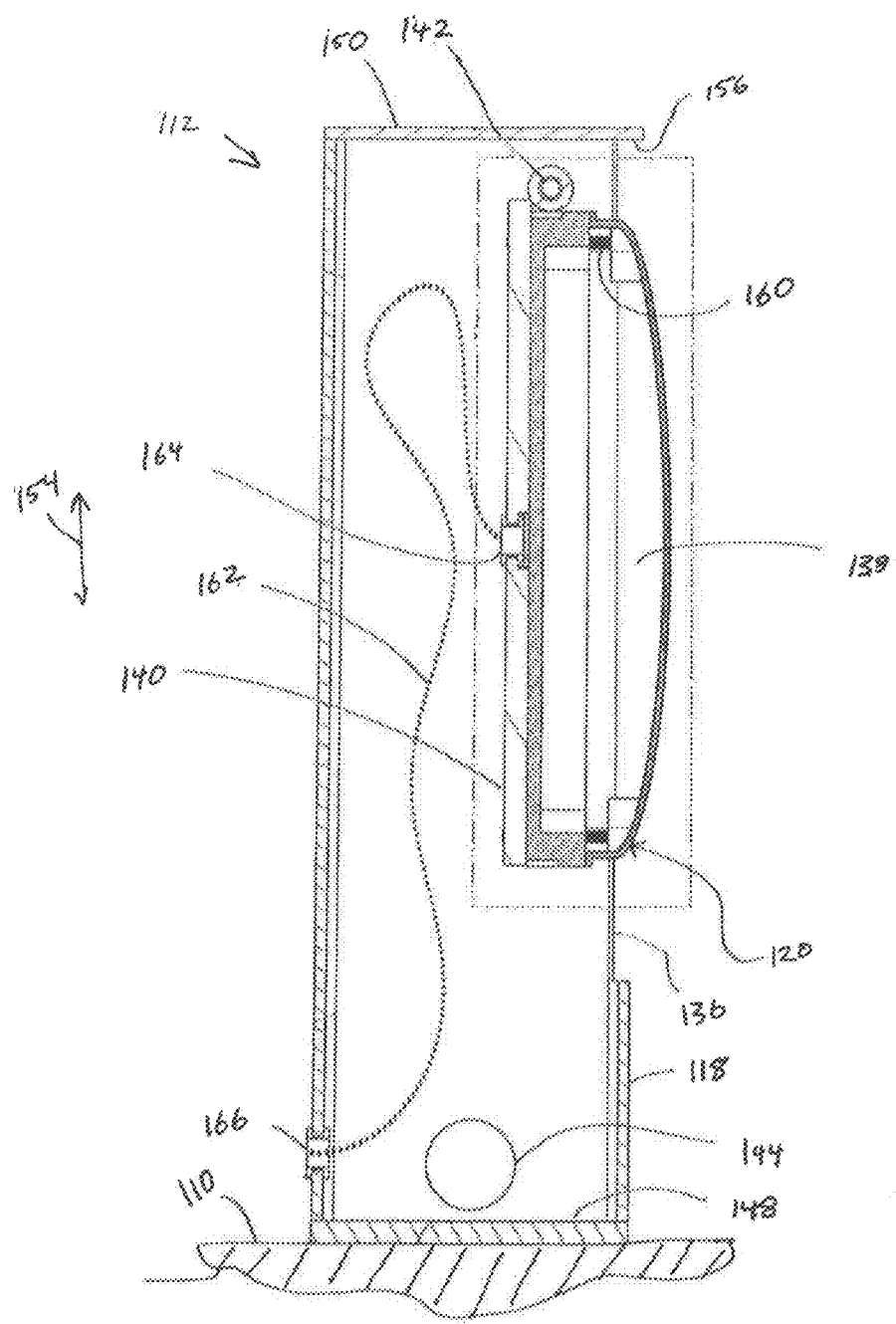
FIG. 6 is a sectional view, in elevation, taken along line 6-6 of FIG. 5.
Figure 7:
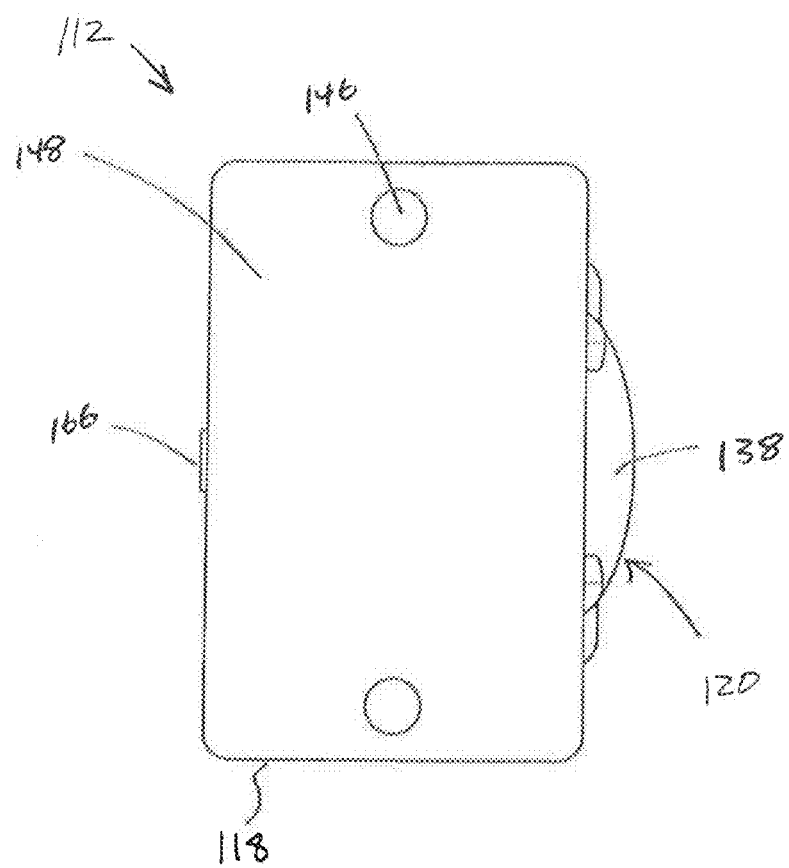
FIG. 7 is a bottom elevational view of the warning light assembly illustrated in FIGS. 1 and 2.

Referring now to FIGS. 4 and 6, the pendulum plate 140 is suspended from the rod 142. The rod 142 is secured to the housing 118 by first and second pivot screws 158A and 158B, respectively. Alternatively, the pendulum plate 140 may be suspended from any other suitable pivotable structure or device. The pendulum plate 140 is fabricated from a suitable material. For example, the pendulum plate 140 may be fabricated from stainless steel. When the light assembly 120 is in the first light position 120', the pendulum plate 140 is positioned within the housing 118.

As discussed, the bulb 138 is mounted to the pendulum plate 140. In the embodiment illustrated in FIG. 6, the bulb 138 is secured to the pendulum plate 140 by a plurality of screws 160. Alternatively, the bulb 138 may be secured to the pendulum plate 140 by another suitable structures, mechanisms and devices, such as the non-limiting examples of clips and clamps. The bulb 138 may be any suitable light bulb. For example, the bulb 138 may be one or more LED and/or incandescent bulbs. Additionally, the bulb 138 may emit any desired color of light. For example, the bulb 138 may emit yellow or orange light. The bulb 138 may also be a strobe or flashing light, or a non-strobe light. Throughout the time of loading and unloading of the automobile 116, the warning light 112 may be illuminated. Alternatively, the warning light 112 may be selectively illuminated during loading and unloading of the automobile 116 or other use of the truck 102.

Referring again to FIG. 6, the warning light 112 includes cabling 162 between a first connection 164 with the bulb 138 and a second connection 166. The second connection 166 can be a power source (not illustrated) configured to illuminating the warning light 112. The power source may be part of an electrical system of the truck 102 or a battery pack independent of the electrical system of the truck 102. The cabling 162 may also transmit control signals for the warning light 112. The control signals may include, for example, turning the light assembly 120 on/off, setting a strobe rate, or a light color. The control signals may originate from controls in the cab 104. Alternatively, the controls and/or power source may be incorporated into the housing 118, light assembly 120, or another location. For example, the controls and/or power source may be located in the cargo area 106. When the controls and/or power source are incorporated into the housing 118 or light assembly 120, the second connection 166 may be omitted.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle bed warning light system comprising:
    a vehicle having a tilt bed movable between a first position and a second position, wherein the first position has a substantially horizontal orientation relative to a ground surface and the second position has an inclined orientation relative to a ground surface;
    a housing mounted on the vehicle, wherein the housing has an opening;
    a pendulum plate pivotally suspended from the housing, wherein the plate is configured to pivot through the opening when the tilt bed moves between the first position and the second position; and
    a light assembly mounted to the pendulum plate.

2. The vehicle bed warning light system of claim 1, wherein the housing shields the light assembly from wind currents.

3. The vehicle bed warning light system of claim 1 wherein the light assembly includes an LED bulb.

4. The vehicle bed warning light system of claim 1 wherein the pendulum plate has a substantially perpendicular orientation relative to a ground surface supporting the vehicle when the tilt bed moves between the first position and the second position.

5. The vehicle bed warning light of claim 1, wherein the light assembly projects a beam of light having a longitudinal axis that is substantially parallel to a ground surface supporting the vehicle when the tilt bed moves between the first position and the second position.

6. The vehicle bed warning light system of claim 1, wherein the force of gravity pivots the pendulum plate through the opening when the tilt bed moves between the first position and the second position.

7. The vehicle bed warning light system of claim 1, wherein the housing is mounted to the tilt bed.

8. The vehicle bed warning light system of claim 1, wherein the housing is mounted to a stop rail of the vehicle.

9. A combined vehicle and warning light system comprising:
    a vehicle having a tilt bed movable between a first position and a second position, wherein the vehicle is supported by a ground surface, the first position has a substantially horizontal orientation relative to the ground surface, and the second position is inclined relative to the ground surface;
    a housing mounted on the vehicle, wherein the housing has an opening;
    a pendulum plate pivotally suspended from the housing; and
    a light assembly mounted to the pendulum plate, wherein the light assembly is configured to pivot in and out of the housing such that the light assembly projects a beam of light having a longitudinal axis that is substantially parallel to the ground surface when the tilt bed moves between the first position and the second position.

10. The combined vehicle and warning light system of claim 9, wherein the longitudinal axis of the beam of light is substantially parallel to the ground surface when the tilt bed is in the second position.

11. The combined vehicle and warning light system of claim 9 wherein the light assembly pivots through the opening when the tilt bed moves between the first position and the second position.

12. The combined vehicle and warning light system of claim 9 wherein the housing shields the light assembly from wind currents.

13. The combined vehicle and warning light system of claim 9 wherein the light assembly includes an LED bulb.

* * * * *